(12) United States Patent
Kang et al.

(10) Patent No.: US 12,696,316 B2
(45) Date of Patent: Jul. 28, 2026

(54) METHOD AND APPARATUS FOR ASSISTING WIRELESS COMMUNICATION DEVICE WITH SWITCH BACK OPERATION FOR EARLY SWITCHING BACK TO LISTENING OPERATION ON ENHANCED MULTI-LINK SINGLE RADIO LINKS

(71) Applicant: MEDIATEK INC., Hsin-Chu (TW)

(72) Inventors: Hao-Hua Kang, Hsinchu City (TW); Chih-Chun Kuo, Hsinchu City (TW); Chien-Fang Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/233,332

(22) Filed: Aug. 14, 2023

(65) Prior Publication Data

US 2024/0064808 A1 Feb. 22, 2024

Related U.S. Application Data

(60) Provisional application No. 63/371,647, filed on Aug. 17, 2022.

(51) Int. Cl.
*H04W 74/0816* (2024.01)

(52) U.S. Cl.
CPC ............................... *H04W 74/0816* (2013.01)

(58) Field of Classification Search
CPC ............. H04W 74/0816; H04W 76/15; H04W 36/0027; H04W 36/28
See application file for complete search history.

(56) References Cited

U.S. PATENT DOCUMENTS

| | | | | |
|---|---|---|---|---|
| 2016/0066222 A1* | 3/2016 | Makinen | ............. | H04W 74/002 |
| | | | | 370/331 |
| 2021/0084711 A1* | 3/2021 | Park | .................. | H04W 72/0453 |
| 2023/0109759 A1* | 4/2023 | Ratnam | ............. | H04W 56/0015 |
| | | | | 370/329 |
| 2023/0144291 A1* | 5/2023 | Naik | .................. | H04W 74/0816 |
| | | | | 370/329 |
| 2023/0199652 A1* | 6/2023 | Mehrnoush | ....... | H04W 52/0216 |
| | | | | 370/311 |
| 2023/0209391 A1* | 6/2023 | Kim | .................. | H04W 28/0252 |
| | | | | 370/329 |
| 2023/0319923 A1* | 10/2023 | Seok | ..................... | H04W 76/15 |
| | | | | 370/329 |

(Continued)

FOREIGN PATENT DOCUMENTS

EP 2938149 A1 * 10/2015 ............ H04W 72/23

OTHER PUBLICATIONS

Overview and Performance Evaluation of Wi-Fi 7 (Year: 2022).*

*Primary Examiner* — Nizar N Sivji
(74) *Attorney, Agent, or Firm* — Winston Hsu

(57) ABSTRACT

A wireless communication device includes a network interface circuit and a control circuit. The network interface circuit performs frame exchanges with a first wireless communication device on a link that is selected from a plurality of links. The first wireless communication device is operating in an enhanced multi-link single radio (EMLSR) mode. The control circuit assists the first wireless communication device with a switch back operation for early switching back to a listening operation on the plurality of links after an end of the frame exchanges between the wireless communication device and the first wireless communication device.

6 Claims, 5 Drawing Sheets

End of EMLSR STA's
TXOP indication

(56)         References Cited

U.S. PATENT DOCUMENTS

| | | | | |
|---|---|---|---|---|
| 2024/0407031 | A1* | 12/2024 | Lin | H04L 5/0053 |
| 2024/0422613 | A1* | 12/2024 | Kim | H04W 74/08 |
| 2025/0039930 | A1* | 1/2025 | Lu | H04W 48/12 |
| 2025/0056614 | A1* | 2/2025 | Quan | H04W 8/22 |
| 2025/0227788 | A1* | 7/2025 | Sevin | H04W 76/15 |

* cited by examiner

1

METHOD AND APPARATUS FOR ASSISTING WIRELESS COMMUNICATION DEVICE WITH SWITCH BACK OPERATION FOR EARLY SWITCHING BACK TO LISTENING OPERATION ON ENHANCED MULTI-LINK SINGLE RADIO LINKS

CROSS REFERENCE TO RELATED APPLICATIONS

This application claims the benefit of U.S. Provisional Application No. 63/371,647, filed on Aug. 17, 2022. The content of the application is incorporated herein by reference.

BACKGROUND

The present invention relates to wireless communications, and more particularly, to a method and apparatus for assisting a wireless communication device with a switch back operation for early switching back to a listening operation on a plurality of enhanced multi-link single radio (EMLSR) links.

In a Wi-Fi multi-link operation (MLO), there may exist several links between two multi-link devices (MLDs), including one access point (AP) MLD and one non-AP MLD. Specifically, MLO is a feature that enables multiple links (e.g., different channels on the same band or different bands) to be associated with one non-AP MLD for transmission and reception with the AP MLD. These links can operate independently to increase the overall throughput and/or to improve the connection stability. The AP MLD may be regarded as having multiple APs affiliated to the same MLD. The non-AP MLD may be regarded as having multiple non-AP stations (STAs) affiliated to the same MLD.

There are various types of multi-link operations that may be supported by Wi-Fi client devices. For example, a non-AP MLD may operate in the EMLSR mode with an AP MLD supporting the EMLSR mode. The EMLSR operation requires the non-AP MLD to listen on multiple links but actual transmission happens on only one of the links. Specifically, the non-AP MLD listens on all EMLSR links by default. The non-AP MLD shall switch its radios (e.g., transceivers) from other EMLSR links to one EMLSR link that is triggered by an initial control frame from the AP to begin frame exchanges with the AP, where the transition delay time of this switch operation is called "padding delay". In addition, the non-AP MLD shall switch its radios (e.g., transceivers) back to other EMLSR links if it considers the current transmission opportunity (TXOP) or transmission has ended from the AP on the EMLSR link being triggered, where the transition delay time of this switch operation is called "transition delay". If the AP performs downlink (DL) transmission with a non-AP MLD on an EMLSR link first, and then performs DL transmission with other peers on the same EMLSR link within the same TXOP, the non-AP MLD that operates in the EMLSR mode may switch back to a listening operation after it detects that the physical layer protocol data unit (PPDU) transmitted from the AP on the EMLSR link is not addressed to itself. For example, the non-AP MLD that operates in the EMLSR mode does not switchback to the listening operation until transmission of the PPDU not addressed to the non-AP MLD is ended. As a result, the non-AP MLD that operates in the EMLSR mode cannot perform transmission/reception on other links during a redundant delay time, where the redundant delay time results from a situation where the AP performs frame exchanges with other peers on the same EMLSR link within the same TXOP after an end of frame exchanges between the AP and the non-AP STA that operates in the EMLSR mode.

Thus, there is a need for an early switch back scheme which allowing the non-AP MLD that operates in the EMLSR mode to switch back to a listening operation on all EMLSR links much earlier.

SUMMARY

One of the objectives of the claimed invention is to provide a method and apparatus for assisting a wireless communication device with a switch back operation for early switching back to a listening operation on a plurality of enhanced multi-link single radio (EMLSR) links.

According to a first aspect of the present invention, an exemplary wireless communication device is disclosed. The exemplary wireless communication device includes a network interface circuit and a control circuit. The network interface circuit is arranged to perform frame exchanges with a first wireless communication device on a link that is selected from a plurality of links, wherein the first wireless communication device is operating in an enhanced multi-link single radio (EMLSR) mode. The control circuit is arranged to assist the first wireless communication device with a switch back operation for early switching back to a listening operation on the plurality of links after an end of the frame exchanges between the wireless communication device and the first wireless communication device.

According to a second aspect of the present invention, an exemplary wireless communication method is disclosed. The exemplary wireless communication method includes: performing frame exchanges with a first wireless communication device on a link that is selected from a plurality of links, wherein the first wireless communication device is operating in an enhanced multi-link single radio (EMLSR) mode; and assisting the first wireless communication device with a switch back operation for early switching back to a listening operation on the plurality of links after an end of the frame exchanges.

According to a third aspect of the present invention, an exemplary wireless communication device is disclosed. The exemplary wireless communication device is operating in an enhanced multi-link single radio (EMLSR) mode, and includes a network interface circuit and a control circuit. The network interface circuit is arranged to perform frame exchanges with a first wireless communication device on a link that is selected from a plurality of links. The control circuit is arranged to perform a switch back operation for early switching back to a listening operation on the plurality of links after an end of the frame exchanges. The control circuit starts the switch back operation before an end of a first transmitted physical layer protocol data unit (PPDU) with data frames that is sent to a second wireless communication device on the link from the first wireless communication device after the end of the frame exchanges.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
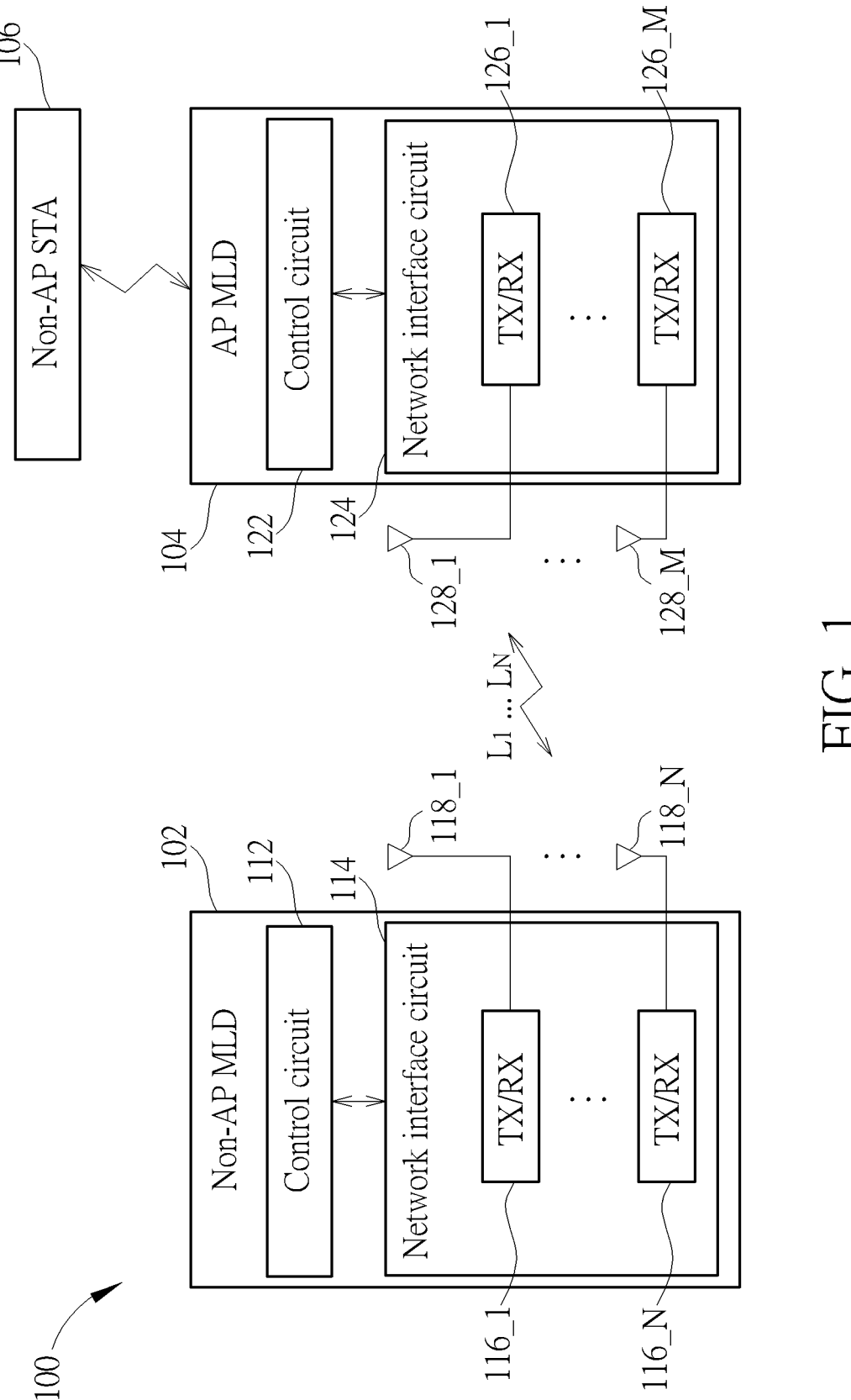
FIG. 1 is a diagram illustrating a wireless communication system according to an embodiment of the present invention.

FIG. 1 is a diagram illustrating a wireless communication system according to an embodiment of the present invention. The wireless communication system 100 includes a plurality of wireless communication devices. For example, the wireless communication system 100 is a Wi-Fi system, and the wireless communication devices include an access point (AP) multi-link device (MLD) 104, a non-AP MLD 102, and a non-AP station (STA) 106, where the AP MLD 104 may be regarded as having multiple APs affiliated to the same MLD, and the non-AP MLD 102 may be regarded as having multiple non-AP STAs affiliated to the same MLD. The non-AP STA 106 is another peer device also associated with the AP MLD 104. In some embodiments, the non-AP STA 106 may be a station affiliated to another non-AP MLD, but the present invention is not limited thereto. For brevity and simplicity, only three wireless communication devices are shown in FIG. 1. In practice, the wireless communication system 100 is allowed to have more than three wireless communication devices in the same basic service set (BSS). By way of example, but not limitation, the non-AP MLD 102, the AP MLD 104, and the non-AP STA 106 may be in compliance with IEEE 802.11be standard.

In this embodiment, the AP MLD 104 may own M links $L_1$-$L_M$, and may communicate with the non-AP MLD 102 via N links $L_1$-$L_N$, where M and N are positive integers, N is not smaller than 2, and M is not smaller than N. Regarding the non-AP MLD 102, it may include a control circuit 112 and a network interface circuit 114, where the network interface circuit 114 supports multiple radios and therefore includes a plurality of transceivers (labeled by "TX/RX") 116_1-116_N coupled to a plurality of antennas 118_1-118_N, respectively. Each of the transceivers 116_1-116_N may be a part of one non-AP STA affiliated to the non-AP MLD 102. Regarding the AP MLD 104, it may include a control circuit 122 and a network interface circuit 124, where the network interface circuit 124 supports multiple radios and therefore includes a plurality of transceivers (labeled by "TX/RX") 126_1-126_M coupled to a plurality of antennas 128_1-128_M, respectively, where M≥N. Each of the transceivers 126_1-126_M may be a part of an AP affiliated to the AP MLD 104. It should be noted that only the components pertinent to the present invention are illustrated in FIG. 1. In practice, the non-AP MLD 102 may include additional components to achieve designated functions, and the AP MLD 104 may include additional components to achieve designated functions. The transceivers 116_1-116_N of the non-AP MLD 102 can communicate with the transceivers 126_1-126_M of the AP MLD 104 via links $L_1$-$L_N$ (N≥1) set up between non-AP MLD 102 and AP MLD 104. For example, the links $L_1$-$L_N$ may be channels at different radio-frequency (RF) bands, including 2.4 GHz band, 5 GHz band and/or 6 GHz band. For another example, the links $L_1$-$L_N$ may be channels at the same RF band. The control circuit 112 at the non-AP MLD 102 and the control circuit 122 at the AP MLD 104 are arranged to control wireless communications between AP MLD 104 and non-AP MLD 102. In addition, the control circuit 122 at the AP MLD 104 is further arranged to control wireless communications between AP MLD 104 and non-AP STA 106. For example, the control circuit 112 controls an STA-side transmit (TX) circuit to deal with uplink (UL) traffic between AP and non-AP STA, and controls an STA-side receive (RX) circuit to deal with downlink (DL) traffic between AP and non-AP STA, and the control circuit 122 controls an AP-side RX circuit to deal with UL traffic between AP and non-AP STA, and controls an AP-side TX circuit to deal with DL traffic between AP and non-AP STA.

Regarding the proposed AP-assisted early switch back scheme under the EMLSR mode, the network interface circuit 124 of the AP MLD 104 is arranged to perform frame exchanges with the non-AP MLD 102 on an EMLSR link that is triggered by the AP MLD 104 and selected from multiple EMLSR links (i.e., links $L_1$-$L_N$) supported by both of the AP MLD 104 and the non-AP MLD 102, and the control circuit 122 of the AP MLD 104 is arranged to assist the non-AP MLD 102 with a switch back operation for early switching back to a listening operation (or a listening mode) on all EMLSR links (i.e., links $L_1$-$L_N$) after an end of the frame exchanges between AP MLD 104 and non-AP MLD 102. With the help of the AP-assisted early switch back scheme, the control circuit 112 of the non-AP MLD 102 may start the switch back operation before an end of a first transmitted PPDU with data frames that is sent to the non-AP STA 106 on a link (which is the same as the EMLSR link) from the AP MLD 104 after the end of the frame exchanges between non-AP MLD 102 and AP MLD 104 over the EMLSR link.

In some embodiments, the control circuit 112 of the non-AP MLD 102 may start the switch back operation before an end of a first transmitted frame encapsulated in the first transmitted PPDU. In some embodiments of the present invention, the control circuit 112 of the non-AP MLD 102 may start the switch back operation before a start of the first transmitted PPDU with data frames that is sent to the non-AP STA 106 on the same EMLSR link from the AP MLD 104 after the end of the frame exchanges between the non-AP MLD 102 and the AP MLD 104. In some embodiments of the present invention, after the end of the frame exchanges between the non-AP MLD 102 and the AP MLD 104, the control circuit 112 of the non-AP MLD 102 may start the switch back operation before a start of frame exchanges between the AP MLD 104 and the non-AP STA 106 on the same EMLSR link. Compared to a typical switch back operation that requires a non-AP MLD to detect if the PPDU transmitted on the EMLSR link is not addressed to itself, the proposed AP-assisted early switch back scheme enables the non-AP MLD 102 to switch back to the listening mode much earlier, thereby allowing the non-AP MLD 102 to efficiently use other EMLSR links for transmission/reception. For better comprehension of technical features of the present invention, several examples of the proposed AP-assisted early switch back scheme are described as below with reference to the accompanying drawings.

Figure 2:
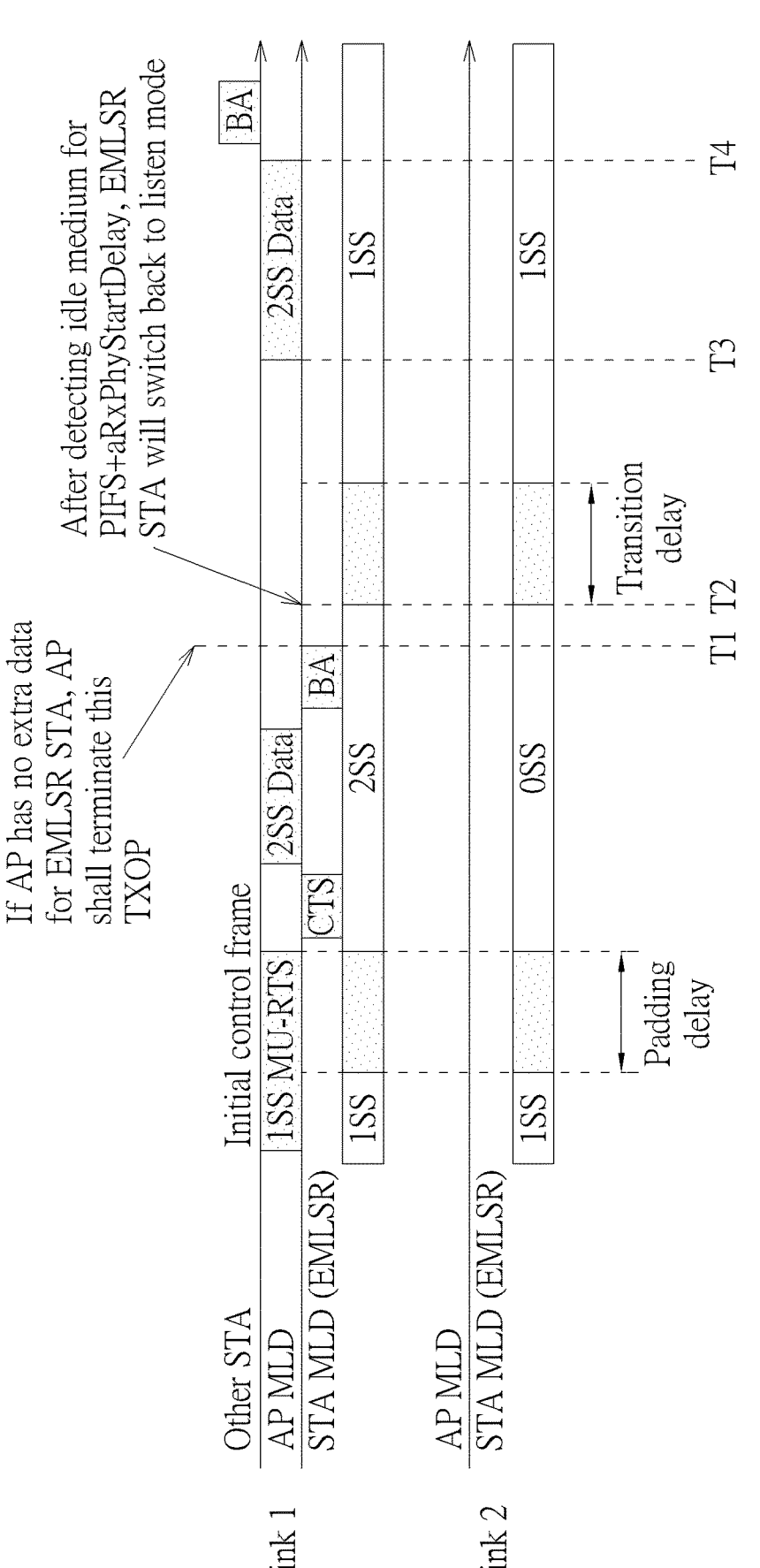
FIG. 2 is a diagram illustrating a first AP-assisted early switch back scheme according to an embodiment of the present invention.

FIG. 2 is a diagram illustrating a first AP-assisted early switch back scheme according to an embodiment of the present invention. The AP MLD 104 is denoted by "AP MLD" in FIG. 2, the non-AP MLD 102 is denoted by "STA MLD (EMLSR)" in FIG. 2, and the non-AP STA 106 is denoted by "Other STA" in FIG. 2. For brevity and simplicity, it is assumed that the non-AP MLD 102 is equipped with two transceivers 116_1-116_N (N=2) and two antennas 118_1-118_N (N=2) to support two EMLSR links "Link 1" and "Link 2" (i.e., links $L_1$-$L_N$ with N=2). Initially, the non-AP MLD 102 performs a listening operation on both EMLSR links "Link 1" and "Link 2", where the transceiver 116_1 operates on the EMLSR link "Link 1" to support one spatial stream (1SS), and the transceiver 116_N (N=2) operates on the EMLSR link "Link 2" to support one spatial stream (1SS). After the non-AP MLD 102 (particularly, network interface circuit 114 of non-AP MLD 102) receives an initial control frame (e.g., a multi-user request to send (MU-RTS) frame) on the EMLSR link "Link 1", the non-AP MLD 102 (particularly, control circuit 112 of non-AP MLD 102) initiates a switch operation to switch the transceiver 116_N (N=2) to the EMLSR link "Link 1" triggered by the AP MLD 104. After the transition delay time (also called "padding delay") elapses, both of transceivers 116_1 and 116_N (N=2) operate on the same EMLSR link "Link 1" to support two spatial streams (2SS). In response to receiving the initial control frame, the non-AP MLD 102 (particularly, control circuit 112 of non-AP MLD 102) generates a response frame (e.g., a clear to send (CTS) frame) and transmits the response frame to the AP MLD 104 over the EMLSR link "Link 1". Next, data frames (i.e., MAC frames with user data) are exchanged between AP MLD 104 and non-AP MLD 102 over the EMLSR link "Link 1". For example, DL traffic from the AP MLD 104 to the non-AP MLD 102 may occur on the EMLSR link "Link 1" that is triggered by the AP MLD 104. If the AP MLD 104 has no extra data for the non-AP MLD 102 and receives a block acknowledgement (BA) frame from the non-AP MLD 102 over the EMLSR link "Link 1", the AP MLD 104 (particularly, control circuit 122 of AP MLD 104) determines that frame exchanges between AP MLD 104 and non-AP MLD 102 over the EMLSR link "Link 1" have ended at the time instant T1.

In this embodiment, the control circuit 122 of the AP MLD 104 assists the non-AP MLD 102 with the switch back operation by terminating a current TXOP owned by the AP MLD 104 after an end of frame exchanges between AP MLD 104 and non-AP MLD 102 over the EMLSR link "Link 1" and before a start of frame exchanges between AP MLD 104 and non-AP STA 106 on the same link at the time instant T3. After the non-AP MLD 102 (particularly, control circuit 112 of non-AP MLD 102) detects an idle wireless medium for a period (e.g., PIFS+aRxPhyStartDelay), the non-AP MLD 102 (particularly, control circuit 112 of non-AP MLD 102) starts the switch back operation at the time instant 12 for switching the transceiver 116_N (N=2) back to the EMLSR link "Link 2". After the transition delay time (also called "transition delay") elapses, the transceivers 116_1 and 116_N (N=2) operate on different EMLSR links "Link 1" and "Link 2" to perform a listening operation on both EMLSR links "Link 1" and "Link 2". As shown in FIG. 2, the time instant T2 at which the non-AP MLD 102 starts the switch back operation is earlier than the start of the first transmitted PPDU of frame exchanges between AP MLD 104 and non-AP STA 106 over a link the same as the EMLSR link "Link 1" (i.e., time instant T3), and is much earlier than an end of the first transmitted PPDU between AP MLD 104 and non-AP STA 106 over a link the same as the EMLSR link "Link 1" (i.e., time instant T4).

Figure 3:
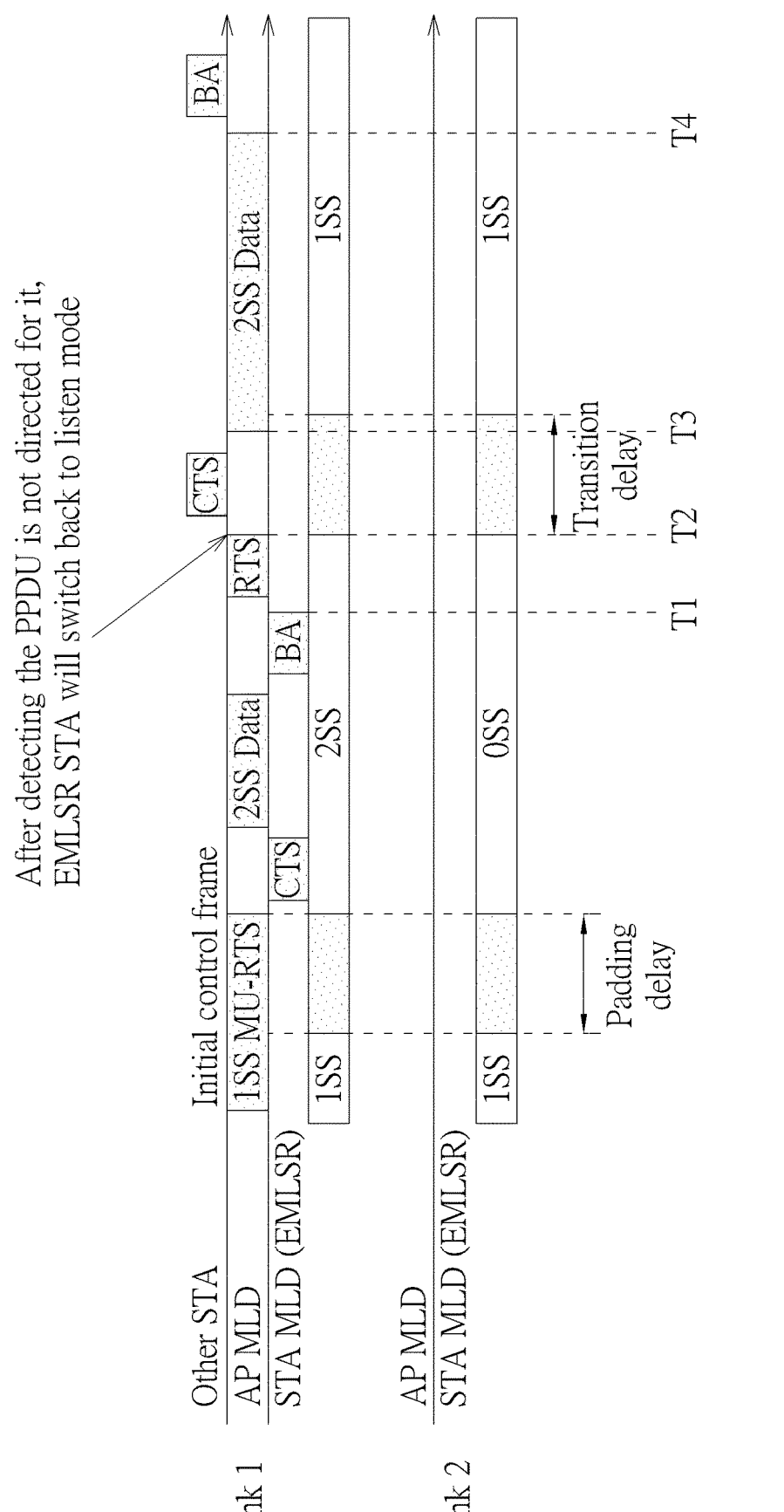
FIG. 3 is a diagram illustrating a second AP-assisted early switch back scheme according to an embodiment of the present invention.

FIG. 3 is a diagram illustrating a second AP-assisted early switch back scheme according to an embodiment of the present invention. The AP MLD 104 is denoted by "AP MLD" in FIG. 3, the non-AP MLD 102 is denoted by "STA MLD (EMLSR)" in FIG. 3, and the non-AP STA 106 is denoted by "Other STA" in FIG. 3. For brevity and simplicity, it is assumed that the non-AP MLD 102 is equipped with two transceivers 116_1-116_N (N=2) and two antennas 118_1-118_N (N=2) to support two EMLSR links "Link 1" and "Link 2" (i.e., links $L_1$-$L_N$ with N=2). Initially, the non-AP MLD 102 performs a listening operation on both EMLSR links "Link 1" and "Link 2", where the transceiver 116_1 operates on the EMLSR link "Link 1", and the transceiver 116_N (N=2) operates on the EMLSR link "Link 2". After the non-AP MLD 102 (particularly, network interface circuit 114 of non-AP MLD 102) receives an initial control frame (e.g., an MU-RTS frame) on the EMLSR link "Link 1", the non-AP MLD 102 (particularly, control circuit 112 of non-AP MLD 102) initiates a switch operation to switch the transceiver 116_N (N=2) to the EMLSR link "Link 1" triggered by the AP MLD 104. After the transition delay time (also called "padding delay") elapses, both of transceivers 116_1 and 116_N (N=2) operate on the same EMLSR link "Link 1". In response to receiving the initial control frame, the non-AP MLD 102 (particularly, control circuit 112 of non-AP MLD 102) generates a response frame (e.g., a CTS frame) and transmits the response frame to the AP MLD 104 over the EMLSR link "Link 1". Next, data frames (i.e., MAC frames with user data) are exchanged between the AP MLD 104 and non-AP MLD 102 over the EMLSR link "Link 1". For example, DL traffic from the AP MLD 104 to the non-AP MLD 102 may occur on the EMLSR link "Link 1" that is triggered by the AP MLD 104. If the AP MLD 104 has no extra data for the non-AP MLD 102 and receives a BA frame from the non-AP MLD 102 over the EMLSR link "Link 1", the AP MLD 104 (particularly, control circuit 122 of AP MLD 104) determines that frame exchanges between AP MLD 104 and non-AP MLD 102 over the EMLSR link "Link 1" have ended at the time instant T1.

In this embodiment, the control circuit 122 of the AP MLD 104 assists the non-AP MLD 102 with the switch back operation by sending a first frame to the non-AP STA 106 on a link the same as the EMLSR link "Link 1" after the end of frame exchanges between AP MLD 104 and non-AP MLD 102 and before a start of second frame (s) sent to the non-AP STA 106 from the AP MLD 104 on the same link, where a length of the first frame is shorter than a length of the second frame. For example, the first frame is a control frame, a null data frame, or a quality of service (QoS) null data frame; and each second frame is a data frame that carries user data. As shown in FIG. 3, an RTS frame may be used as the first frame. Hence, the non-AP STA 106 responds with a CTS frame after receiving the RTS frame sent from the AP MLD 104 over a link the same as the EMLSR link "Link 1". Compared to a data frame with a longer frame length that is addressed to the non-AP STA 106, the RTS frame addressed to the non-AP STA 106 has a shorter frame length. Compared to a typical switch back operation that detects if a PPDU (which carries data frames) sent from the AP MLD 104 is not addressed to a non-AP MLD, the proposed AP-assisted early switch back scheme enables the non-AP MLD 102 to detect that a PPDU (which carries a control frame or a (QoS) null frame) sent from the AP MLD 104 is not addressed to itself in a shorter time period due to the fact that the control frame/(QoS) null frame has a shorter frame length. As shown in FIG. 3, the non-AP MLD 102 (particularly, control circuit 112 of non-AP MLD 102) starts the switch back operation at an end of the RTS frame (i.e., time instant T2) for switching the transceiver 116_N (N=2) back to the EMLSR link "Link 2". After the transition delay time (also called "transition delay") elapses, the transceivers 116_1 and 116_N (N=2) operate on different EMLSR links "Link 1" and "Link 2" to perform a listening operation on both EMLSR links "Link 1" and "Link 2". As shown in FIG. 3, the time instant T2 at which the non-AP MLD 102 starts the switch back operation is earlier than the start of the first transmitted PPDU of frame exchanges between AP MLD 104 and non-AP STA 106 over the EMLSR link "Link 1" (i.e., time instant T3), and is much earlier than an end of the first transmitted PPDU of frame exchanges between AP MLD 104 and non-AP STA 106 over the EMLSR link "Link 1" (i.e., time instant T4). It should be noted that frame exchanges between non-AP MLD 102 and AP MLD 104 over the EMLSR link "Link 1" and frame exchanges between non-AP STA 106 and AP MLD 104 over the same EMLSR link "Link 1" are within the same TXOP owned by the AP MLD 104.

Figure 4:
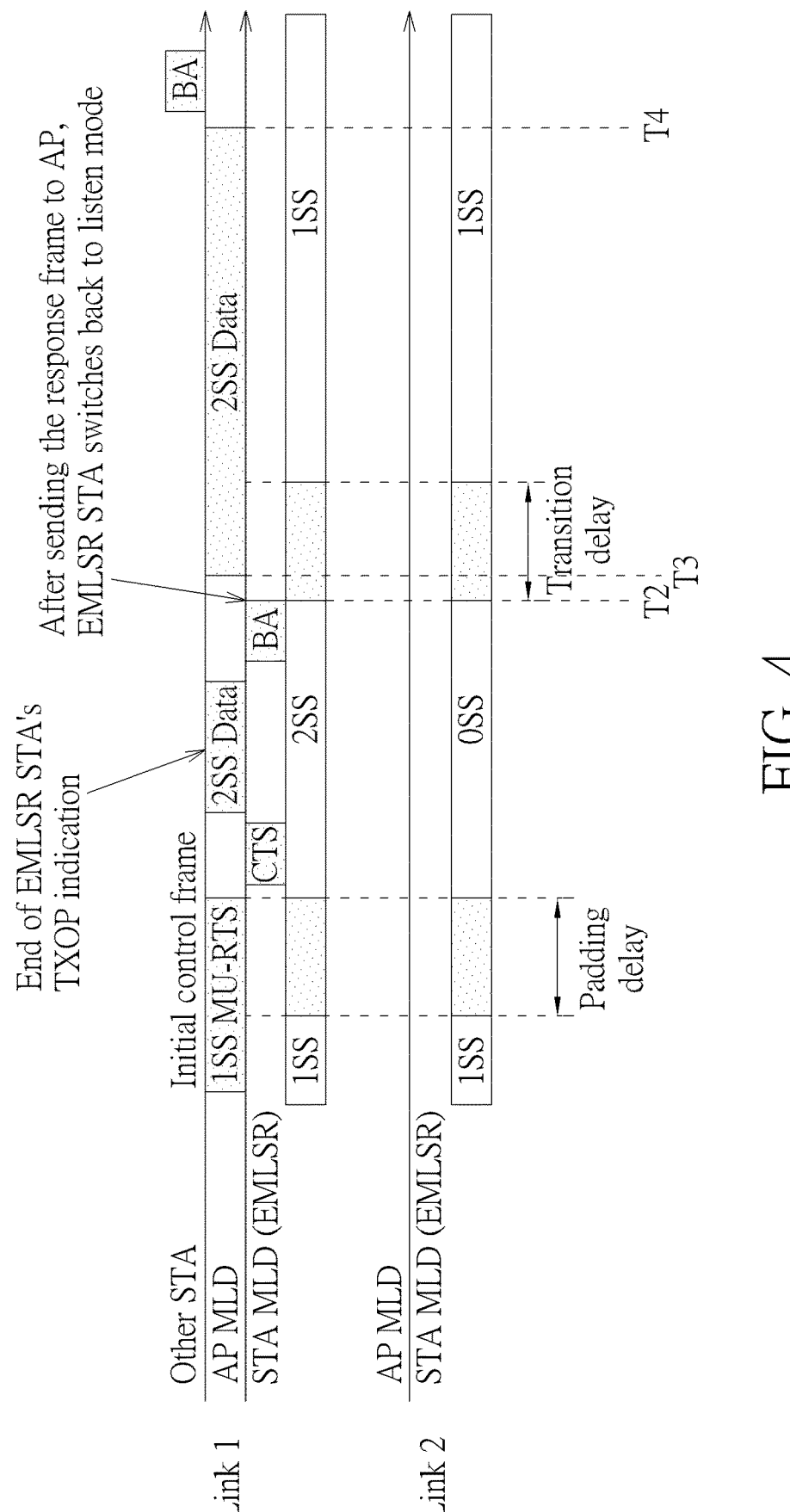
FIG. 4 is a diagram illustrating a third AP-assisted early switch back scheme according to an embodiment of the present invention.

FIG. 4 is a diagram illustrating a third AP-assisted early switch back scheme according to an embodiment of the present invention. The AP MLD 104 is denoted by "AP MLD" in FIG. 4, the non-AP MLD 102 is denoted by "STA MLD (EMLSR)" in FIG. 4, and the non-AP STA 106 is denoted by "Other STA" in FIG. 4. For brevity and simplicity, it is assumed that the non-AP MLD 102 is equipped with two transceivers 116_1-116_N (N=2) and two antennas 118_1-118_N (N=2) to support two EMLSR links "Link 1" and "Link 2" (i.e., links $L_1$-$L_N$ with N=2). Initially, the non-AP MLD 102 performs a listening operation on both EMLSR links "Link 1" and "Link 2", where the transceiver 116_1 operates on the EMLSR link "Link 1", and the transceiver 116_N (N=2) operates on the EMLSR link "Link 2". After the non-AP MLD 102 (particularly, network interface circuit 114 of non-AP MLD 102) receives an initial control frame (e.g., an MU-RTS frame) on the EMLSR link "Link 1", the non-AP MLD 102 (particularly, control circuit 112 of non-AP MLD 102) initiates a switch operation to switch the transceiver 116_N (N=2) to the EMLSR link "Link 1" triggered by the AP MLD 104. After the transition delay time (also called "padding delay") elapses, both of transceivers 116_1 and 116_N (N=2) operate on the same EMLSR link "Link 1". In response to receiving the initial control frame, the non-AP MLD 102 (particularly, control circuit 112 of non-AP MLD 102) generates a response frame (e.g., a CTS frame) and transmits the response frame to the AP MLD 104 over the EMLSR link "Link 1". Next, data frames (i.e., MAC frames with user data) are exchanged between AP MLD 104 and non-AP MLD 102 over the EMLSR link "Link 1". For example, DL traffic from the AP MLD 104 to the non-AP MLD 102 may occur on the EMLSR link "Link 1" that is triggered by the AP MLD 104. If the AP MLD 104 has no extra data for the non-AP MLD 102 and receives a BA frame from the non-AP MLD 102 over the EMLSR link "Link 1", the AP MLD 104 (particularly, control circuit 122 of AP MLD 104) determines that frame exchanges between AP MLD 104 and non-AP MLD 102 over the EMLSR link "Link 1" have ended at the time instant T2.

In this embodiment, assuming that a last transmitted PPDU sent from AP MLD 104 to non-AP MLD 102 during the frame exchanges between non-AP MLD 102 and AP MLD 104 can be successfully received by the non-AP MLD 102, the control circuit 122 of the AP MLD 104 can assist the non-AP MLD 102 with the switch back operation by setting a switch back indication in the last transmitted PPDU sent from AP MLD 104 to non-AP MLD 102 during the frame exchanges between non-AP MLD 102 and AP MLD 104 over the EMLSR link "Link 1", where the switch back indication may be carried in a PPDU preamble, a MAC header, or a MAC frame body. For example, the switch back indication is used to indicate that the current PPDU is the last transmitted PPDU sent from AP MLD 104 to non-AP MLD 102 during the frame exchanges between non-AP MLD 102 and AP MLD 104 over the EMLSR link "Link 1", and may be set in an EOSP (End Of Service Period) subfield in a QoS control field, a more data subfield in a frame control field, a power management (PM) subfield in the frame control field, a control subfield in an HE (High Efficiency) variant control field, or any reserved/unused bit in the 802.11 frame format.

After receiving the switch back indication, the non-AP MLD 102 knows that the current PPDU is the last transmitted PPDU sent from AP MLD 104 to non-AP MLD 102 during the frame exchanges between non-AP MLD 102 and AP MLD 104 over the EMLSR link "Link 1". Hence, after responding with a BA frame, the non-AP MLD 102 (particularly, control circuit 112 of non-AP MLD 102) starts the switch back operation at an end of the frame exchanges (i.e., time instant T2) for switching the transceiver 116_N (N=2) back to the EMLSR link "Link 2". After the transition delay time (also called "transition delay") elapses, the transceivers 116_1 and 116_N (N=2) operate on different EMLSR links "Link 1" and "Link 2" to perform a listening operation on both EMLSR links "Link 1" and "Link 2". As shown in FIG. 4, the time instant T2 at which the non-AP MLD 102 starts the switch back operation is earlier than the start of the first transmitted PPDU of frame exchanges between AP MLD 104 and non-AP STA 106 over a link the same as the EMLSR link "Link 1" (i.e., time instant T3), and is much earlier than an end of the first transmitted PPDU between AP MLD 104 and non-AP STA 106 over the EMLSR link "Link 1" (i.e., time instant T4). It should be noted that frame exchanges between non-AP MLD 102 and AP MLD 104 over the EMLSR link "Link 1" and frame exchanges between non-AP STA 106 and AP MLD 104 over the EMLSR link "Link 1" are within the same TXOP owned by the AP MLD 104.

Figure 5:
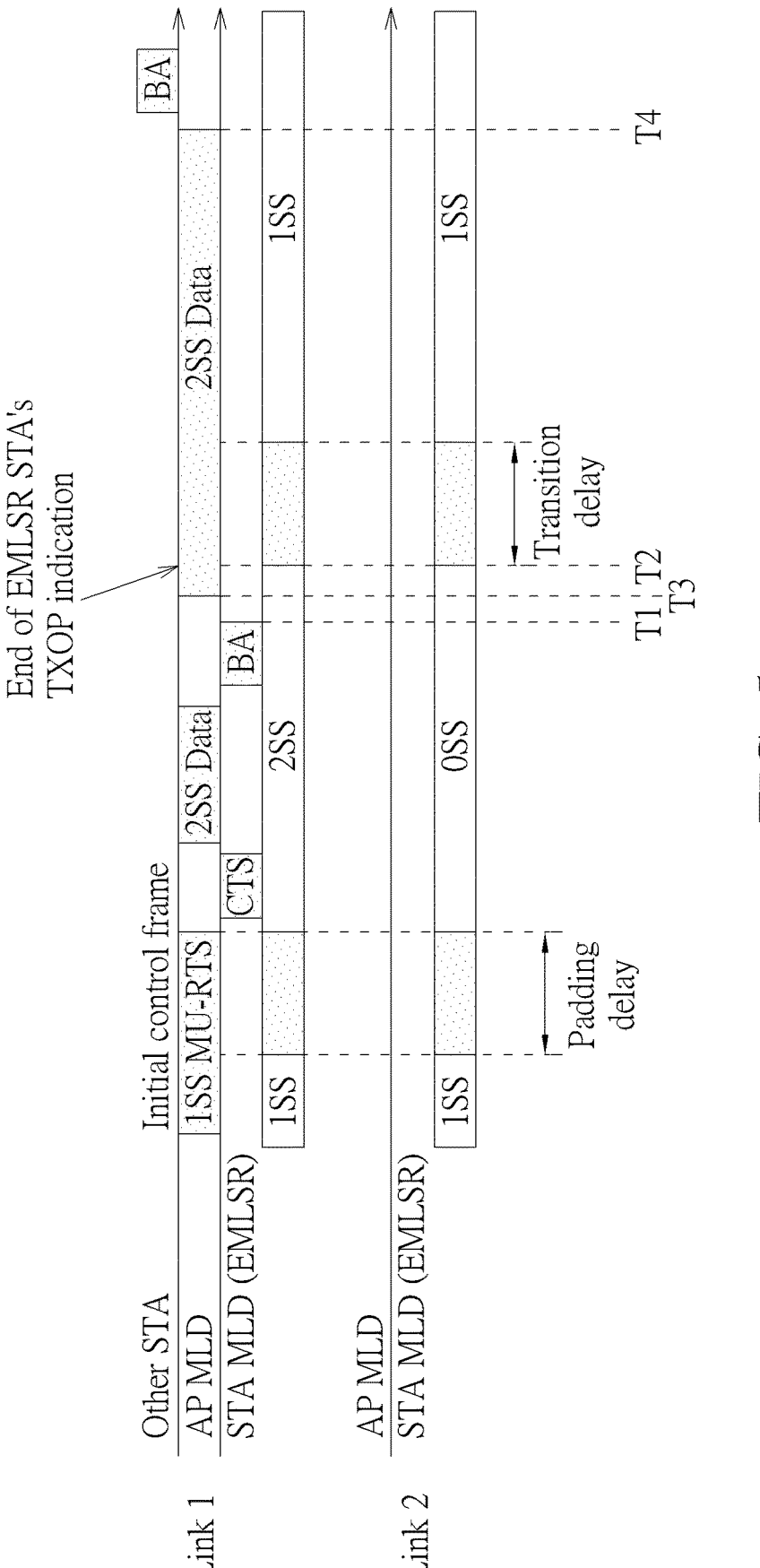
FIG. 5 is a diagram illustrating a fourth AP-assisted early switch back scheme according to an embodiment of the present invention.

FIG. 5 is a diagram illustrating a fourth AP-assisted early switch back scheme according to an embodiment of the present invention. The AP MLD 104 is denoted by "AP MLD" in FIG. 5, the non-AP MLD 102 is denoted by "STA MLD (EMLSR)" in FIG. 5, and the non-AP STA 106 is denoted by "Other STA" in FIG. 5. For brevity and simplicity, it is assumed that the non-AP MLD 102 is equipped with two transceivers 116_1-116_N (N=2) and two antennas 118_1-118_N (N=2) to support two EMLSR links "Link 1" and "Link 2" (i.e., links $L_1$-$L_N$ with N=2). Initially, the non-AP MLD 102 performs a listening operation on both EMLSR links "Link 1" and "Link 2", where the transceiver 116_1 operates on the EMLSR link "Link 1", and the transceiver 116_N (N=2) operates on the EMLSR link "Link 2". After the non-AP MLD 102 (particularly, network interface circuit 114 of non-AP MLD 102) receives an initial control frame (e.g., an MU-RTS frame) on the EMLSR link "Link 1", the non-AP MLD 102 (particularly, control circuit 112 of non-AP MLD 102) initiates a switch operation to switch the transceiver 116_N (N=2) to the EMLSR link "Link 1" triggered by the AP MLD 104. After the transition delay time (also called "padding delay") elapses, both of transceivers 116_1 and 116_N (N=2) operate on the same EMLSR link "Link 1". In response to receiving the initial control frame, the non-AP MLD 102 (particularly, control circuit 112 of non-AP MLD 102) generates a response frame (e.g., a CTS frame) and transmits the response frame to the AP MLD 104 over the EMLSR link "Link 1". Next, data frames (i.e., MAC frames with user data) are exchanged between AP MLD 104 and non-AP MLD 102 over the EMLSR link "Link 1". For example, DL traffic from the AP MLD 104 to the non-AP MLD 102 may occur on the EMLSR link "Link 1" that is triggered by the AP MLD 104. If the AP MLD 104 has no extra data for the non-AP MLD 102 and receives a BA frame from the non-AP MLD 102 over the EMLSR link "Link 1", the AP MLD 104 (particularly, control circuit 122 of AP MLD 104) determines that frame exchanges between AP MLD 104 and non-AP MLD 102 over the EMLSR link "Link 1" have ended at the time instant T1.

In this embodiment, the control circuit 122 of the AP MLD 104 assists the non-AP MLD 102 with the switch back operation by setting a switch back indication in a first transmitted PPDU that is sent to the non-AP STA 106 on a link (which is the same as the EMLSR link "Link 1") from the AP MD 104 after the end of frame exchanges between non-AP MLD 102 and AP MLD 104, where the switch back indication may be carried in a PPDU preamble, a MAC header, or a MAC frame body. For example, the switch back indication is indicative of an end of the frame exchanges between non-AP MLD 102 and AP MLD 104 over the EMLSR link "Link 1", and may be set in an EOSP subfield in a QoS control field, a more data subfield in a frame control field, a PM subfield in the frame control field, a control subfield in an HE variant control field, or any reserved/unused bit in the 802.11 frame format.

After receiving the switch back indication, the non-AP MLD 102 knows that the current PPDU is not addressed to itself. Since the switch back indication may be carried in a PPDU preamble of the current PPDU (which is the first transmitted PPDU from AP MLD 104 to non-AP STA 106 since the end of frame exchanges between AP MLD 104 and non-AP MLD 102), or a MAC header of a first transmitted MAC frame encapsulated in the current PPDU, or a frame body of the first transmitted MAC frame encapsulated in the current PPDU, the AP MLD 104 (particularly, control circuit 122 of AP MLD 104) may start the switch back operation before an end of the first transmitted MAC frame encapsulated in the current PPDU for switching the transceiver 116_N (N=2) back to the EMLSR link "Link 2". After the transition delay time (also called "transition delay") elapses, the transceivers 116_1 and 116_N (N=2) operate on different EMLSR links "Link 1" and "Link 2" to perform a listening operation on both EMLSR links "Link 1" and "Link 2". As shown in FIG. 5, the time instant T2 at which the non-AP MLD 102 starts the switch back operation is later than the start of the first transmitted PPDU of frame exchanges between AP MLD 104 and non-AP STA 106 over the EMLSR link "Link 1", but can be earlier than an end of the first transmitted MAC frame encapsulated in the first transmitted PPDU between AP MLD 104 and non-AP STA 106 over the EMLSR link "Link 1". Specifically, the time instant T2 at which the non-AP MLD 102 starts the switch back operation is much earlier than an end of the first transmitted PPDU of frame exchanges between AP MLD 104 and non-AP STA 106 over the EMLSR link "Link 1" (i.e., time instant T4). It should be noted that frame exchanges between non-AP MLD 102 and AP MLD 104 over the EMLSR link "Link 1" and frame exchanges between non-AP STA 106 and AP MLD 104 over the EMLSR link "Link 1" are within the same TXOP owned by the AP MLD 104.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device comprising:
   a network interface circuit, arranged to perform frame exchanges with a first wireless communication device on a link that is selected from a plurality of links, wherein the first wireless communication device is operating in an enhanced multi-link single radio (EMLSR) mode; and
   a control circuit, arranged to assist the first wireless communication device with a switch back operation for early switching back to a listening operation on the plurality of links after an end of the frame exchanges between the wireless communication device and the first wireless communication device;
   wherein the control circuit assists the first wireless communication device with the switch back operation by sending a first frame to a second wireless communication device on the link after the end of the frame exchanges and before a start of at least one second frame sent to the second wireless communication device from the wireless communication device on the link, where the first frame is not addressed to the first wireless communication device, and a length of the first frame is shorter than a length of the at least one second frame.

2. The wireless communication device of claim 1, wherein the first frame is a control frame, a null data frame, or a quality of service (QoS) null data frame.

3. A wireless communication method comprising:
   performing frame exchanges with a first wireless communication device on a link that is selected from a plurality of links, wherein the first wireless communication device is operating in an enhanced multi-link single radio (EMLSR) mode; and
   assisting the first wireless communication device with a switch back operation for early switching back to a listening operation on the plurality of links after an end of the frame exchanges, comprising:
      sending a first frame to a second wireless communication device on the link after the end of the frame exchanges and before sending at least one second frame sent to the second wireless communication device on the link, wherein the first frame is not addressed to the first wireless communication device, and a length of the first frame is shorter than a length of the at least one second frame.

4. The wireless communication method of claim 3, wherein the first frame is a control frame, a null data frame, or a quality of service (QoS) null data frame.

5. A wireless communication device comprising:

a network interface circuit, arranged to perform frame exchanges with a first wireless communication device on a link that is selected from a plurality of links, wherein the wireless communication device is operating in an enhanced multi-link single radio (EMLSR) mode; and a control circuit, arranged to perform a switch back operation for early switching back to a listening operation on the plurality of links after an end of the frame exchanges;

wherein the control circuit starts the switch back operation before an end of a first transmitted physical layer protocol data unit (PPDU) that is sent to a second wireless communication device on the link from the first wireless communication device after the end of the frame exchanges; the control circuit is further arranged to detect the first transmitted PPDU is not addressed to the wireless communication device; and the control circuit starts the switch back operation before a start of the first transmitted PPDU that is sent to the second wireless communication device on the link from the first wireless communication device after the end of the frame exchanges.

6. The wireless communication device of claim 5, wherein the control circuit starts the switch back operation before an end of a first transmitted frame encapsulated in the first transmitted PPDU.

\* \* \* \* \*